US009008693B2

(12) United States Patent
Boldyrev et al.

(10) Patent No.: US 9,008,693 B2
(45) Date of Patent: Apr. 14, 2015

(54) METHOD AND APPARATUS FOR INFORMATION AGGREGATION AROUND LOCATIONS

(75) Inventors: Sergey Boldyrev, Söderkulla (FI); Marco Paglia, San Francisco, CA (US); Ian Justin Oliver, Söderkulla (FI); Mika Juhani Mannermaa, Burlington, MA (US); Justin Oppelaar, Ridgefield, CT (US)

(73) Assignee: Nokia Corporation, Espoo (FI)

( * ) Notice: Subject to any disclaimer, the term of this patent is extended or adjusted under 35 U.S.C. 154(b) by 436 days.

(21) Appl. No.: 12/890,279

(22) Filed: Sep. 24, 2010

(65) Prior Publication Data

US 2012/0077521 A1    Mar. 29, 2012

(51) Int. Cl.
*H04W 24/00*    (2009.01)
*H04W 4/04*    (2009.01)
*G06F 17/30*    (2006.01)

(52) U.S. Cl.
CPC ........... *H04W 4/043* (2013.01); *G06F 17/3087* (2013.01); *G06F 17/30241* (2013.01)

(58) Field of Classification Search
CPC ....... H04W 4/02; H04W 4/021; H04W 4/206; H04W 64/00; G06F 17/30241; G06F 17/30041; G06Q 30/0261; G06Q 30/0267
USPC ........................ 455/456.1–457; 340/988–996; 701/400–541
See application file for complete search history.

(56) References Cited

U.S. PATENT DOCUMENTS

| 5,559,707 | A | 9/1996 | DeLorme et al. |
| 5,802,492 | A | 9/1998 | DeLorme et al. |
| 5,848,373 | A | 12/1998 | DeLorme et al. |
| 5,948,040 | A | 9/1999 | DeLorme et al. |
| 6,321,158 | B1 | 11/2001 | DeLorme et al. |
| 7,461,528 | B2 | 12/2008 | Taniguchi et al. |
| 7,693,912 | B2 | 4/2010 | Rose et al. |
| 2003/0182052 | A1 | 9/2003 | DeLorme et al. |
| 2005/0055353 | A1 | 3/2005 | Marx et al. |
| 2006/0238379 | A1 | 10/2006 | Kimchi et al. |
| 2006/0238380 | A1 | 10/2006 | Kimchi et al. |
| 2006/0238381 | A1 | 10/2006 | Kimchi et al. |

(Continued)

FOREIGN PATENT DOCUMENTS

| AU | 2007248062 A1 | 11/2007 |
| BR | P1079715 A2 | 7/2011 |

(Continued)

OTHER PUBLICATIONS

International Search Report for related International Patent Application No. PCT/FI2011/050697 dated Feb. 10, 2012, pp. 1-7.

(Continued)

*Primary Examiner* — George Eng
*Assistant Examiner* — Marcus Hammonds
(74) *Attorney, Agent, or Firm* — Ditthavong & Steiner, P.C.

(57) ABSTRACT

An approach is provided for information aggregation around locations. An information aggregation platform determines one or more content items, the content items provided by respective one or more content sources. The information aggregation platform also determines respective location information associated with the one or more content items. The information aggregation platform further determines to group the one or more content items based, at least in part, on the respective location information.

18 Claims, 11 Drawing Sheets

(56) References Cited

U.S. PATENT DOCUMENTS

| | | |
|---|---|---|
| 2006/0238382 A1 | 10/2006 | Kimchi et al. |
| 2006/0238383 A1 | 10/2006 | Kimchi et al. |
| 2006/0241859 A1 | 10/2006 | Kimchi et al. |
| 2006/0241860 A1 | 10/2006 | Kimchi et al. |
| 2006/0271277 A1* | 11/2006 | Hu et al. ............ 701/202 |
| 2007/0210937 A1 | 9/2007 | Smith et al. |
| 2007/0260628 A1 | 11/2007 | Fuchs et al. |
| 2007/0273558 A1 | 11/2007 | Smith et al. |
| 2008/0167794 A1 | 7/2008 | Fuchs et al. |
| 2008/0177464 A1 | 7/2008 | Fuchs et al. |
| 2008/0215524 A1 | 9/2008 | Fuchs et al. |
| 2009/0019081 A1 | 1/2009 | Safra et al. |
| 2009/0073191 A1 | 3/2009 | Smith et al. |
| 2009/0100018 A1 | 4/2009 | Roberts |
| 2009/0157635 A1 | 6/2009 | Fuchs et al. |
| 2009/0171939 A1 | 7/2009 | Athsani et al. |
| 2009/0241040 A1 | 9/2009 | Mattila et al. |
| 2010/0070603 A1 | 3/2010 | Moss et al. |
| 2010/0118025 A1 | 5/2010 | Smith et al. |
| 2010/0250599 A1 | 9/2010 | Schmidt et al. |
| 2010/0331016 A1 | 12/2010 | Dutton et al. |
| 2012/0046862 A1* | 2/2012 | Griffin et al. ............ 701/521 |
| 2012/0220314 A1* | 8/2012 | Altman et al. ............ 455/456.3 |

FOREIGN PATENT DOCUMENTS

| | | |
|---|---|---|
| CA | 2257258 A1 | 12/1997 |
| CA | 2280677 A1 | 2/2000 |
| CA | 2514232 A1 | 8/2004 |
| CA | 2650487 A1 | 11/2007 |
| CN | 101427104 A | 5/2009 |
| CN | 101438231 A | 5/2009 |
| CN | 101978709 A | 2/2011 |
| CN | 102063512 A | 5/2011 |
| EP | 1588340 A1 | 10/2005 |
| EP | 1872284 A2 | 1/2008 |
| EP | 2013702 A2 | 1/2009 |
| EP | 2255552 A1 | 12/2010 |
| JP | 2008-538825 A | 11/2008 |
| JP | 2009-536372 A | 10/2009 |
| KR | 20080007437 A | 1/2008 |
| KR | 20090018038 A | 2/2009 |
| KR | 20100127282 A | 12/2010 |
| RU | 2008147401 A | 6/2010 |
| WO | WO 97/48065 A1 | 12/1997 |
| WO | WO 2004/070676 A1 | 8/2004 |
| WO | WO 2006/116240 A2 | 11/2006 |
| WO | WO 2007/131044 A2 | 11/2007 |
| WO | WO 2009/115648 A1 | 9/2009 |

OTHER PUBLICATIONS

International Written Opinion for related International Patent Application No. PCT/IF2011/050697 dated Feb. 10, 2012, pp. 1-13.
Oliver et al., "Operations on Spaces of Information", Nokia Research Center, Helsinki, Finland, 2009 IEEE International Conference on Semantic Computing, IEEE Computer Society, pp. 267-274.
U.S. Appl. No. 12/571,575, filed Oct. 1, 2009, Sergey Boldyrev et al.
U.S. Appl. No. 12/623,184, filed Nov. 2, 2009, Sergey Boldyrev et al.
U.S. Appl. No. 12/813,248, filed Jun. 10, 2010, Sergey Boldyrev et al.
U.S. Appl. No. 61/387,252, filed Sep. 28, 2010, Ian Justin Oliver et al.
Process Migration, Milogicic et al., Dec. 5, 1998, pp. 1-24. Accessed: http://www.hpl.hp.com/techreports/1999/HPL-1999-21.pdf.
Process Migration, Milogicic et al., Dec. 5, 1998, pp. 25-48. Accessed: http://www.hpl.hp.com/techreports/1999/HPL-1999-21.pdf.
Process Migration, Milogicic et al., Feb. 1999, pp. 1-1. Accessed: http://www.hpl.hp.com/techreports/1999/HPL-1999-21.pdf.
Tracking RDF Graph Provenance using RDF Molecules, Ding et al., pp. 1-2. Accessed on Aug. 17, 2010, http://aisl.umbc.edu/resources/219.pdf.

* cited by examiner

METHOD AND APPARATUS FOR INFORMATION AGGREGATION AROUND LOCATIONS

BACKGROUND

Mobile devices with various methods of connectivity are now for many people becoming the primary gateway to the internet and also a major storage point for personal information. This is in addition to the normal range of personal computers and furthermore sensor devices plus internet based providers. Combining these devices together and lately the applications (e.g., including user interface elements of these applications) and the information stored by those applications is a major challenge of interoperability. Consequently, manufacturers of mobile devices (e.g., cellular phones) are challenged to continually add greater functional capabilities in smaller form factors. By way of example, one of these functional capabilities includes ubiquitous access to data and/or internet connections over, for instance, cellular data connections.

At the same time, there has been development of distributed systems for managing information and related applications and/or processes and providing access to a wide range of a user's own information and potentially any information that has been shared to the user, wherein a user may be a person, a group of people, or some other entity or collection of entities. Additionally, these distributed systems facilitate interaction with information sources through the use of mobile wireless devices and support collaborative operations on shared data representations. The computers in a distributed system environment may communicate with other participants in the system and provide requested information through text, speech and visual displays.

However, despite the fact that information accessible by users can be distributed with different levels of granularity, still there is a challenge to achieve scalable high context information processing within heterogeneous network environments, wherein information is provided by various independent sources. Another challenge in this regard is to represent scaling of high context information processing through user interfaces in order to achieve better reception from user experience perspectives. For example, currently users have access to increasing amount of content published online which support global navigation coordinates such as GPS (Global Positioning System) coordinates and this trend is only meant to grow in the coming years, as more and more devices will be equipped with GPS sensors. However, the available content is still dispersed and scattered in various websites, databases, social networks, etc. throughout the global networks, wherein the content is mostly grouped by time (when the content was published) and people (who published it). One important challenges is the processing of local content (content grouped by location) provided by various sources, bounding the content, and presenting the content to the user.

SOME EXAMPLE EMBODIMENTS

Therefore, there is a need for an approach for aggregation of information from multiple sources around locations and providing the information to the users according to locality (e.g., their current place, places of interest, etc.).

According to one embodiment, a method comprises determining one or more content items, the content items provided by respective one or more content sources. The method also comprises determining respective location information associated with the one or more content items. The method further comprises determining to group the one or more content items based, at least in part, on the respective location information.

According to another embodiment, an apparatus comprises at least one processor, and at least one memory including computer program code, the at least one memory and the computer program code configured to, with the at least one processor, cause, at least in part, the apparatus to determine one or more content items, the content items provided by respective one or more content sources. The apparatus is also caused to determine respective location information associated with the one or more content items. The apparatus is further caused to determine to group the one or more content items based, at least in part, on the respective location information.

According to another embodiment, a computer-readable storage medium carries one or more sequences of one or more instructions which, when executed by one or more processors, cause, at least in part, an apparatus to determine one or more content items, the content items provided by respective one or more content sources. The apparatus is also caused to determine respective location information associated with the one or more content items. The apparatus is further caused to determine to group the one or more content items based, at least in part, on the respective location information.

According to another embodiment, an apparatus comprises means for determining one or more content items, the content items provided by respective one or more content sources. The apparatus also comprises means for determining respective location information associated with the one or more content items. The apparatus further comprises means for determining to group the one or more content items based, at least in part, on the respective location information.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing information aggregation around locations are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
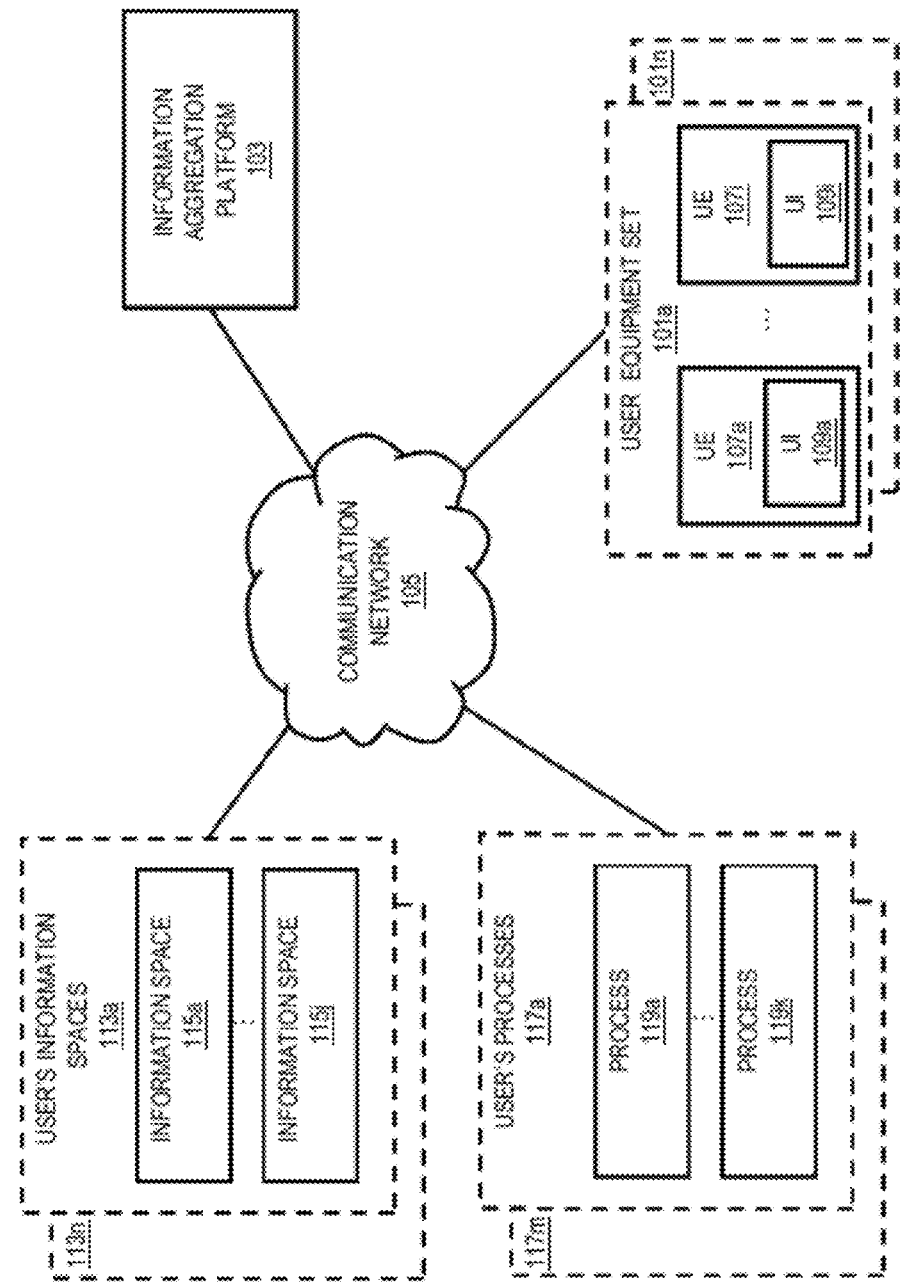
FIG. 1 is a diagram of a system capable of providing information aggregation around locations, according to one embodiment.

FIG. 1 is a diagram of a system capable of providing information aggregation around locations, according to one embodiment. The volume and type of content provided to the users through various user equipment via communication networks are rapidly increasing. At the same time, number of information providers that try to attract users by offering useful information for different groups of users with various interests is also rising. A major type of provided content is location-based information provided by various sources such as social networks, specialized websites, personal web pages, weblogs, etc. The current trend in information aggregation typically involves aggregation of information around people (e.g., users), meaning that the content associated with a certain person or a group of people is aggregated and displayed. However, a user or a group of users with a common interest may want to have information presented to them based on location. Furthermore, the user or group of users may want the location based information from multiple sources to be collectively presented on one or more interfaces of their devices.

To address this problem, a system 100 of FIG. 1 introduces the capability to provide location based aggregated information from multiple sources to the users. In one embodiment, location based information aggregation can be provided to network users via information spaces, which allow interoperation among distributed information and processes from different sources.

Information spaces, also referred to as smart spaces, provide very flexible multi-sourcing that accounts and relies on the observation that the same piece of information and/or related processes can come from different sources. For example, the same information and/or related processes (e.g., contact information for a particular contact) can appear in the same information space from multiple sources (e.g., a locally stored contacts database, a public directory, a work contact database, etc.). In one embodiment, information within the information space or smart space is represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information that is implemented in web resources; using a variety of syntax formats. Although various embodiments are described with respect to information spaces and RDF, it is contemplated that the approach described herein may be used with other structures and conceptual description methods used to create models of information.

An information space may consist of, for instance, several distributed devices that communicate information (e.g., RDF graphs) via a shared memory such as a Semantic Information Broker (SIB). In one embodiment, a device within an information space environment may store information locally in its own memory space or publish information to the semantic information broker. In the first case, the device is responsible for any process needed for combination or extraction of information, while in the second case the data manipulation processes can be conducted by the semantic information broker. By way of example, the information stored within an information space may be organized as lists or sets of information that can include many data elements (e.g., a contact list, inventory of goods, business directory, etc.).

The basic concept of information space technology includes providing access to distributed information for various devices within the scope of the information space. In certain embodiments, this access is provided in such a way that the distributed nature of the information is hidden from users. As a result, the information space appears to a user as if all the accessed information is stored on the same device. The information space also enables a user to have control over information distribution by transferring information between devices that the user has access to. For example, a user may want to transfer information among work devices, home devices, and portable devices. Current technologies enable a user of a mobile device to manipulate contents such as data and information via the elements of one or more user interfaces of one or more user equipments.

In one embodiment, the mechanism of system 100 enables a user or a group of users to have access to distributed online information based on the location. According to this solution, distributed online content is grouped together into places according to their location coordinates (e.g., GPS coordinates) or other location information. The content may include information and computation streams in the form of information and computation closures, wherein the closures are bound to the streams of data. As used herein, computation closures refer to relations and communications among various computations including passing arguments, sharing process results, flow of data and process results, etc. Once a computation is divided into its primitive computation closures, the processes within or represented by each closure may be executed in a distributed fashion and the processing results can be collected and aggregated into the result of the execution of the initial overall computation.

According to the mechanism of system 100, places and landmarks such as bars, restaurants, houses, concert halls, parks, etc., become vessels for the content, so that people can retrieve information not only by time or publisher, but also by where this information is localized (e.g., on a memory tags). By using this system, people can access generic online content by simply looking at the latest updated information that is embedded in places around them. The system introduced, is based on revising the way that content is distributed, and making it accessible in context, in accordance with where people are and what kinds of activities they are engaged in.

The distributed nature of information and computation closures enables a user to have control over distribution of computation. For example, a user may want to know and control where pieces of computation exist. In the same fashion, any content can be bound to elements of a user interface (UI). Additionally, distributed computation provides users with visual programming as fragments of computation, wherein the representation of objects on an output device (e.g., display unit) is bound with computation closures those objects are based on.

Binding between UI elements, or UI regions, and actual computations is provided through computation closures defined and kept by seamless information management infrastructure enhanced by seamless information processing techniques, wherein the distributed nature of information and computations is hidden from the user and all the accessed information and computations appear local to the user. This approach provides potential slicing of computation between various devices, platforms, and environments.

As shown in FIG. 1, the system 100 comprises a user equipment (UE) 101 having connectivity to information aggregation platform 103 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth, Internet Protocol (IP) data casting, satellite, mobile ad-hoc network (MANET), and the like, or any combination thereof.

The UEs 107a-107i are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 107a-107i can support any type of interface to the user (such as "wearable" circuitry, etc.).

In one embodiment, the UEs 107a-107i are respectively equipped with one or more user interfaces (UI) 109a-109i. Each UI 109a-109i may consist of several UI elements (not shown) at any time, depending on the service that is being used. UI elements may be icons representing user content such as information (e.g., music information, contact information, video information, etc.), functions (e.g., setup, search, etc.) and/or processes (e.g., download, play, edit, save, etc.). Additionally, each UI element may be bound to a context/process by granular migration. In one embodiment, processes may be implicitly or explicitly distributed (migrated) between devices, information spaces, and other infrastructure. The process migration can be initiated for example by means of single-cast (e.g., to just another UE 107) or multi-cast (e.g., to multiple other UEs 107). Additionally, process migration may be triggered via gesture recognition, wherein the user preselects a particular set of UI elements and makes a gesture to simulate "pouring" the selected UE elements from one device to another.

In one embodiment, a UI element may be a region of the UI 109a-109i which is defined by the user as a free-shape contour using fingers or a pointing device. In another embodiment, gesture recognition may be used when user grabs a preselected set of UI elements or a predefined region of the UI and moves it from one device to another or from one logical representation to another.

As seen in FIG. 1, a user of UEs 107a-107i may own various pieces of information distributed over a set 113a of information spaces 115a-115j. The user can access the information via the set of equipment 101a consisting of UEs 107a-107i wherein each UE 107a-107i is equipped with one or more user interfaces (UI) 109a-109i. Furthermore, each UE 107a-107i may have access to a set 117a of processes 119a-119k that can be used to manipulate the information stored in information spaces 115a-115j and produce results requested by the user of the UE.

In one embodiment, an information management infrastructure (not shown) consists of information about binding between the elements of each UI 109a-109i, areas of rendered UIs 109a-109i and actual information processing through processes 119a-119k. The binding information enables a user of a UE 107a-107i to; for example, visually assign particular tasks to other UEs owned by the same user. For example, the user may select the tasks that need to be completed, by touching the UI elements related to those tasks on a UI of a first UE, pointing the UE towards other on-premises entities (other UEs in the vicinity of the first UE), distribute the actual computation for the selected tasks to other UEs by kicking out, brushing off or pouring the particular UI elements from the first UE to other UEs through figure gestures.

In one embodiment, binding between the elements or regions of UIs 109a-109i and the actual computations or functions performed by processes 119a-119k is done through computation closures defined and stored by the information management infrastructure. As previously described, the computation closures provide the capability of slicing of computations for processes 119a-119k for a user and transmitting the computation slices between UEs 107a-107i, and information spaces 115a-115j.

The information management infrastructure may use seamless information processing techniques in order to enhance the computation closures. Seamless information management is the enabling technology for reflective process or context migration. In one embodiment, in addition to the migration of computations between devices, virtual execution environments may be dynamically bound. The application of seamless information processing techniques may allow dynamically balanced load between concurrent execution environments taking into account the user's current context.

In one embodiment, computation closures may be generated and stored using Resource Description Framework (RDF) format. RDF is a family of World Wide Web Consortium (W3C) specifications originally designed as a metadata data model. It has come to be used as a general method for conceptual description or modeling of information that is implemented in web resources; using a variety of syntax formats. The underlying structure of any expression in RDF is a collection of triples, each consisting of three disjoint sets of nodes including a subject, a predicate and an object. A subject is an RDF URI reference (U) or a Blank Node (B), a predicate is an RDF URI reference (U), and an object is an RDF URI reference (U), a literal (L) or a Blank Node (B). A set of such triples is called an RDF graph. Table 1 shows an example RDF graph structure.

TABLE 1

| Subject | Predicate | Object |
| --- | --- | --- |
| uri://....../rule#CD-introduction, | rdf:type, | uri://............/Rule |
| uri://....../rule#CD-introduction, | uri://....../rule#assumption, | "c" |

In one embodiment, the information aggregation platform 103 provides aggregated information to the users of UEs 107a-107i, based on location. The information aggregation platform 103 which can be set up by a remote server via the communication network 105 may collect content items provided from one or more content sources and group the collected content items based, at least in part, on location information. The location information may be provided by the user, predefined as a default, automatically obtained from a navigation device, such as GPS navigator, as the current location of the UE, and presumably the user, or any combination thereof. The location information may also be calculated based on the relative location of multiple UEs. For example a group of friends who are currently in different places may want to search for a gathering place with certain properties which is accessible to all of them within almost equal travel times. In this example the target location can be calculated by the information aggregation platform 103 based on individual location of each of the users.

In another embodiment, the information aggregation platform 103 may granularly fraction one or more UI elements or regions of the UI 109a-109i. The granularity is achieved by the basic format of the operation (e.g., RDF graph operations) within the information space environment. The computation closures, which may be represented as RDF graphs, provide the reflectivity properties wherein data and processes are all presented in similar RDF form and can be distributed throughout the information space environment. Additionally, the context may be partly stored as RDF in the information space and partly be harvested from the execution environment. The harvesting process may be performed by local harvesting agents on different computation platforms.

Furthermore, the information aggregation platform 103 identifies specific user context and run-time context groups and stores them in RDF format and binds the identified one or more UI elements with the specific user context. The information aggregation platform 103 also determines the targeted virtual run-time environment and stores it in RDF format within the information space environment. Either of the user context, run-time context, and virtual run-time context may be identified based on current user activities and functions, predefined device setups, system default setups, or a combination thereof.

Subsequently, the information aggregation platform 103 checks the consistency among identified contexts and solves the inconsistencies, if any, by refining the user context, run-time context groups, local harvesting agents, or a combination thereof. The information aggregation platform 103 then redistributes computations related with the targeted virtual run-time environment, where the computations are executed and results are provided to the users via their UEs.

By way of example, the UEs 107a-107i, and the information aggregation platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
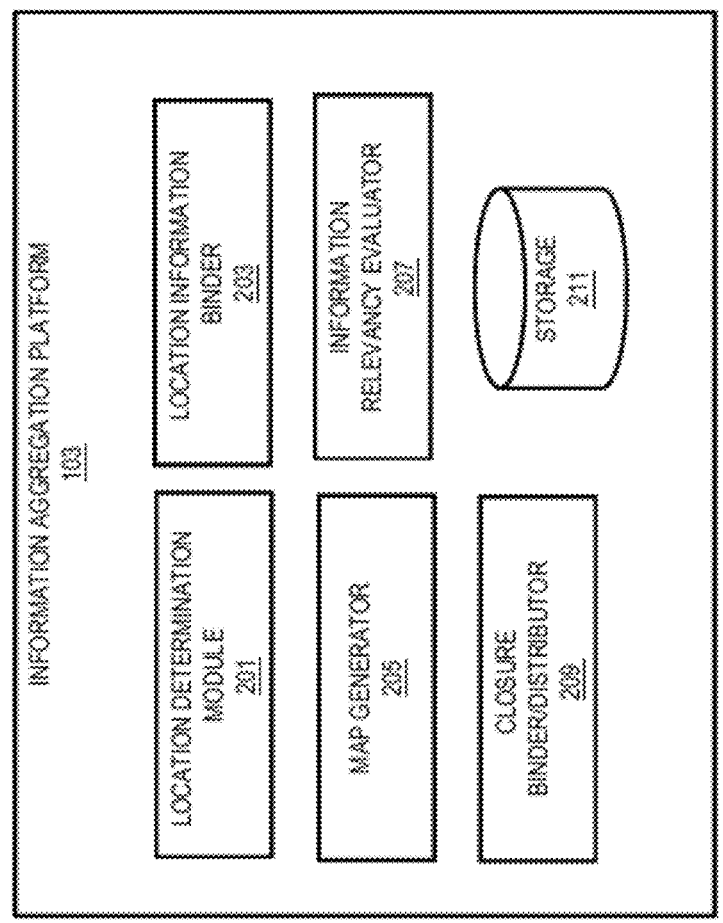
FIG. 2 is a diagram of the components of information aggregation platform, according to one embodiment.

FIG. 2 is a diagram of the components of information aggregation platform, according to one embodiment. By way of example, the information aggregation platform 103 includes one or more components for providing information aggregation around locations. It is contemplated that the functions of these components may be combined in one or more components or performed by other components of equivalent functionality. In this embodiment, the information aggregation platform 103 includes a location determination module 201, a location information binder 203, a map generator 205, an information relevancy evaluator 207, a closure binder/distributor 209 and a storage 211.

In one embodiment, the information aggregation platform 103 may receive a request from one or more UEs for aggregated content associated with one or more locations. The requesting UEs may publish their request along with their local connectivity details and other information, which may include the operator information and location. The UEs may be equipped with specific services such as discounts, coupons, etc. by joining a service for providing aggregated information. The aggregated access mode may be optionally selected by the user of the UE, automatically activated by the provider or a combination thereof.

Following the receipt of request for aggregated information from a group of UEs, the location determination module

201 may obtain information about the location of requesting UEs. Once the requesting UEs are located, the location information binder 203 gathers information from the information spaces 113a-113n based on the request. In one embodiment, the location information binder may search the information spaces 113a-113n for information in response to UEs query and store the information in storage 211. In another embodiment, the information associated with the request may have been initially stored in the information space 113a-113n categorized by location. In this embodiment, the location information binder 203 may first search the information space for information associated with the location of requesting UEs and then scan the information for answers to the specific requests. The location information binder 203 may also combine multiple requests into one or decompose a request to multiple simpler requests in order to make the search more efficient.

In one embodiment, the location information binder 203 may obtain content from multiple sources such as social networks, professional websites, online search engines, personal websites, etc. Even though the information provided by various sources may have different incompatible formats, it is converted into generic RDF format prior to being stored in the information spaces 113a-113n. The computations regarding the information search and processing are parts of the operations of the information aggregation platform and may have already be in RDF format. Therefore, computations and information are all stored and handled in the same format as computation closures. In one embodiment, the location information binder 203 binds each content to its associated location. For example, information about a restaurant may be bound to the location of the restaurant in a GPS coordinate system (x1, y1).

In one embodiment, the location information binder 203 may also group the content items according to their location. For example, put all items with location coordinates (x1, y1) in the same group.

In one embodiment, the map generator 205 accesses the contents grouped based on their location by the location information binder 203, and generates a mapping display of those contents. The display may represent the content items, one or more links to the one or more content items, or a combination thereof.

In one embodiment, prior to the information representation in a map display, the information relevancy evaluator 207 may determine the relevancy of content based, at least in part, on the context associated with one or more users, the content items, the respective location information or a combination thereof. The information relevancy evaluator 207 may remove irrelevant or inconsistent content or check restrictions of content representations such as privacy or security related issues. The context associated with users or content items may include time, date, a certain contact, a specific characteristic of the content, etc. or a combination thereof. The information relevancy evaluator 207 filters the location bound content based on the existing context and stores the result in the storage 211. The map generator 205 may use the resulting content for producing the map display of the content.

The content items are provided by the information spaces 113a-113n, and since the structure of information spaces is based on computation and information closures, each content item is associated with one or more computation closures, one or more information closures, or a combination thereof. In one embodiment, prior to display generation by map generator 205, the closure binder/distributor 209 determines one or more information or computation closures associated with the content items and binds the determined information and computation closures to one or more elements of the user interface based, at least in part, on the grouping of content items, their respective location, or a combination thereof. This binding can be used for generating the map display wherein the closures associated with each content item can be processed based on the UI elements they are bound to.

In one embodiment, the information aggregation platform may have the location information binder 203 to group all the available content items according to their location without having to receive any request for content. In this embodiment, each new content can be added to its respective group. This initial grouping may optimize the answering process to requests, since the content is already clustered around locations.

In various embodiments, target location for content item aggregation may be the location of the requesting UEs, a landmark location, a specific address provided by the user, or any combination thereof. In other embodiments, the one or more groups of content items may be associated with one or more places, wherein the one or more places may be described by their names, their types (e.g., house, store, school, etc.), one or more of their characteristics (e.g., square footage of a house) or a combination thereof.

Figure 3:
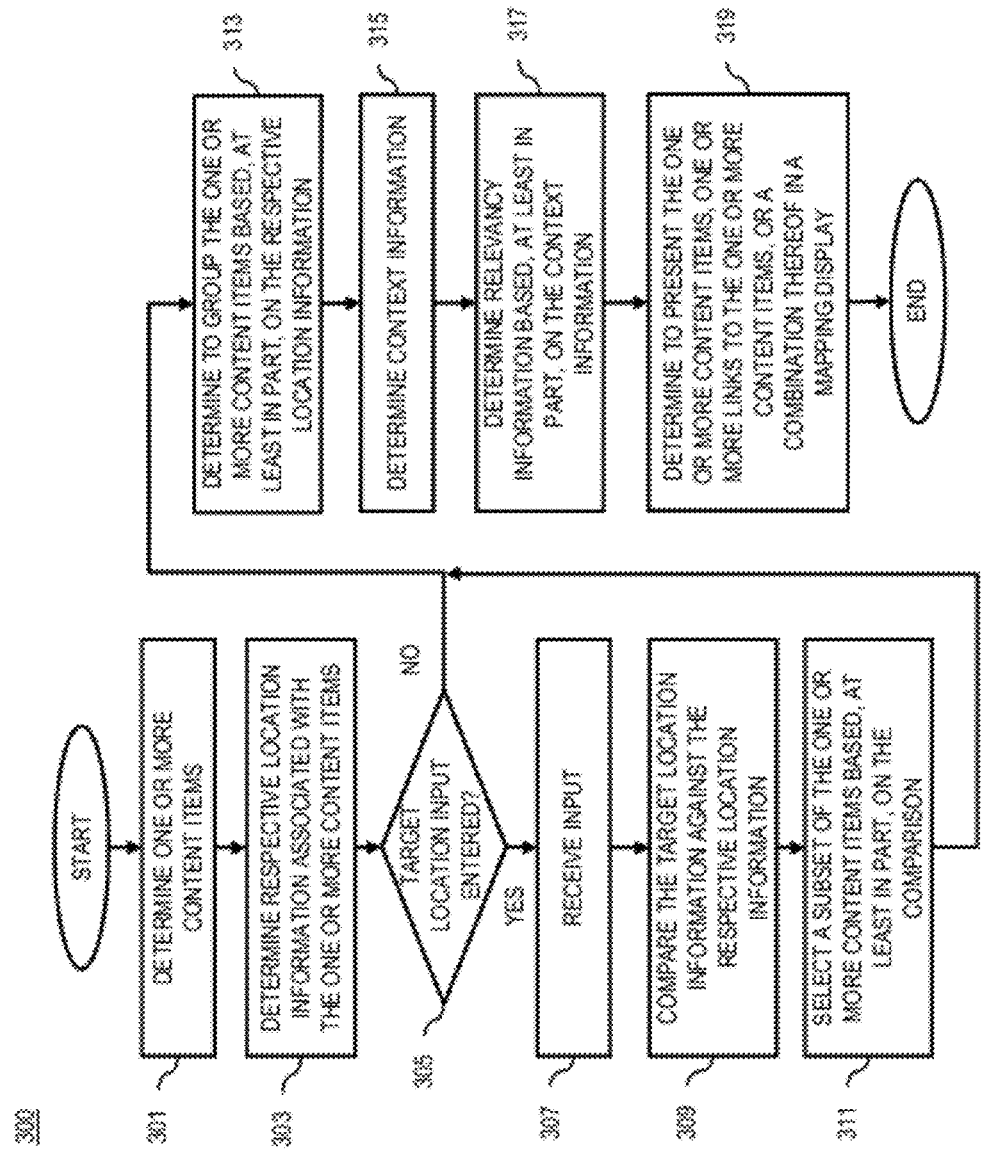
FIG. 3 is a flowchart of a process for providing information aggregation around locations, according to one embodiment.
Figure 10:
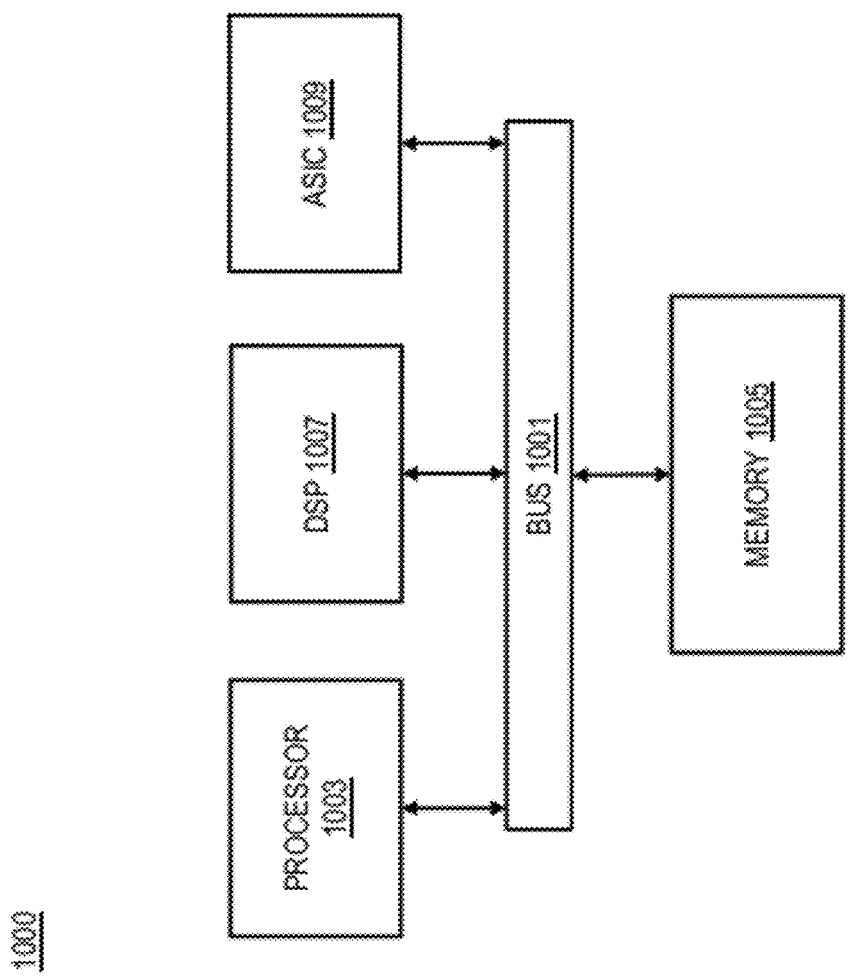
FIG. 10 is a diagram of a chip set that can be used to implement an embodiment of the invention.

FIG. 3 is a flowchart of a process for providing information aggregation around locations, according to one embodiment. In one embodiment, the information aggregation platform 103 performs the process 300 and is implemented in, for instance, a chip set including a processor and a memory as shown in FIG. 10. In step 301, the location determination module 201 determines one or more content items, based on user input, based on new content entry, or a combination thereof. In step 303, the location information binder 203 determines location information for the content items determined in step 301. The location information may be retrieved from maps, GPS navigators, etc. In step 305, the location determination module 201 checks whether a target location for content items has been provided (e.g., by the user). If there is a target location entry, per step 307 the location determination module 201 receives the input and in step 309 compares the target with the location information determined in step 303. The location determination module 201 passes the comparison results to the location information binder 203. If a match between the location target and location information is found, per step 311 the location information binder 203 selects a subset of the content items determined in step 301, at least in part, based on the comparison results from step 309.

In one embodiment, per step 313 the location information binder 203 groups the content items, at least in part, based on location information. If per step 305 a target location input exists the content items that are grouped per step 313 are from the subset selected per step 311. Otherwise, if a target location has not been entered, the whole set of content items determined per step 301 are grouped.

In step 315 the information relevancy evaluator 207 determines the context information associated with a user, the content items determined in step 301 or step 311 and grouped in step 313, the respective location information determined in step 303, the one or more content sources, or a combination thereof. The context information determined per step 315 is used by the information relevancy evaluator 207 per step 317 for determining the relevancy of the grouped content items from step 313 to the determined context. The information relevancy evaluator 207 may omit the content items irrelevant to the context from the groups of content items that will be presented to the UEs 107a-107i. Per step 319 the map generator 205 generates a mapping display based, at least in part, on the grouping of content items determined in step 313. The detailed process of map generation is presented in FIG. 4.

Figure 4:
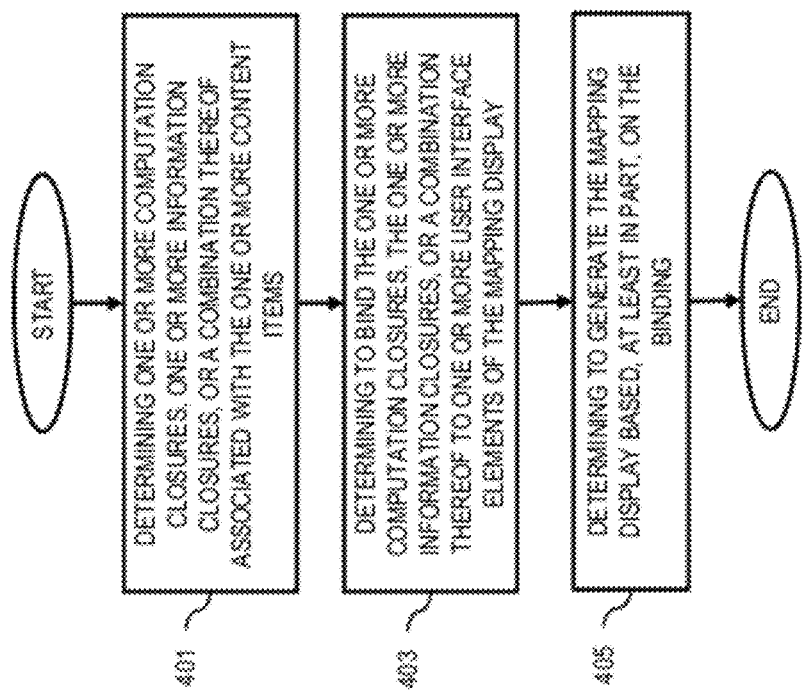
FIG. 4 is a flowchart of a process for generating a mapping display from aggregated information, according to one embodiment.

FIG. 4 is a flowchart of a process for generating a mapping display from aggregated information, according to one embodiment. In one embodiment, the information aggregation platform 103 performs the process 400. In step 401, the closure binding/distributor 209 determining one or more computation closures, one or more information closures, or a combination thereof associated with the one or more content items grouped in step 319 of FIG. 3. The information and computation closures are retrieved from the information spaces 113a-113n. Per step 403, the closure binding/distributor 209 determines bind the one or more computation closures, the one or more information closures, or a combination thereof to one or more user interface elements of the mapping display based, at least in part, on the grouping, the respective location information, or a combination thereof. Binding of the information and computation closures to the UI elements enables the user to trigger execution of various processes associated with the closures by manipulating (touching, dragging, pointing at, etc.) the related UI elements. Per step 405, the map generator 205 generates a display mapping of the content items based, at least in part, on the binding made per step 403.

Figure 5:
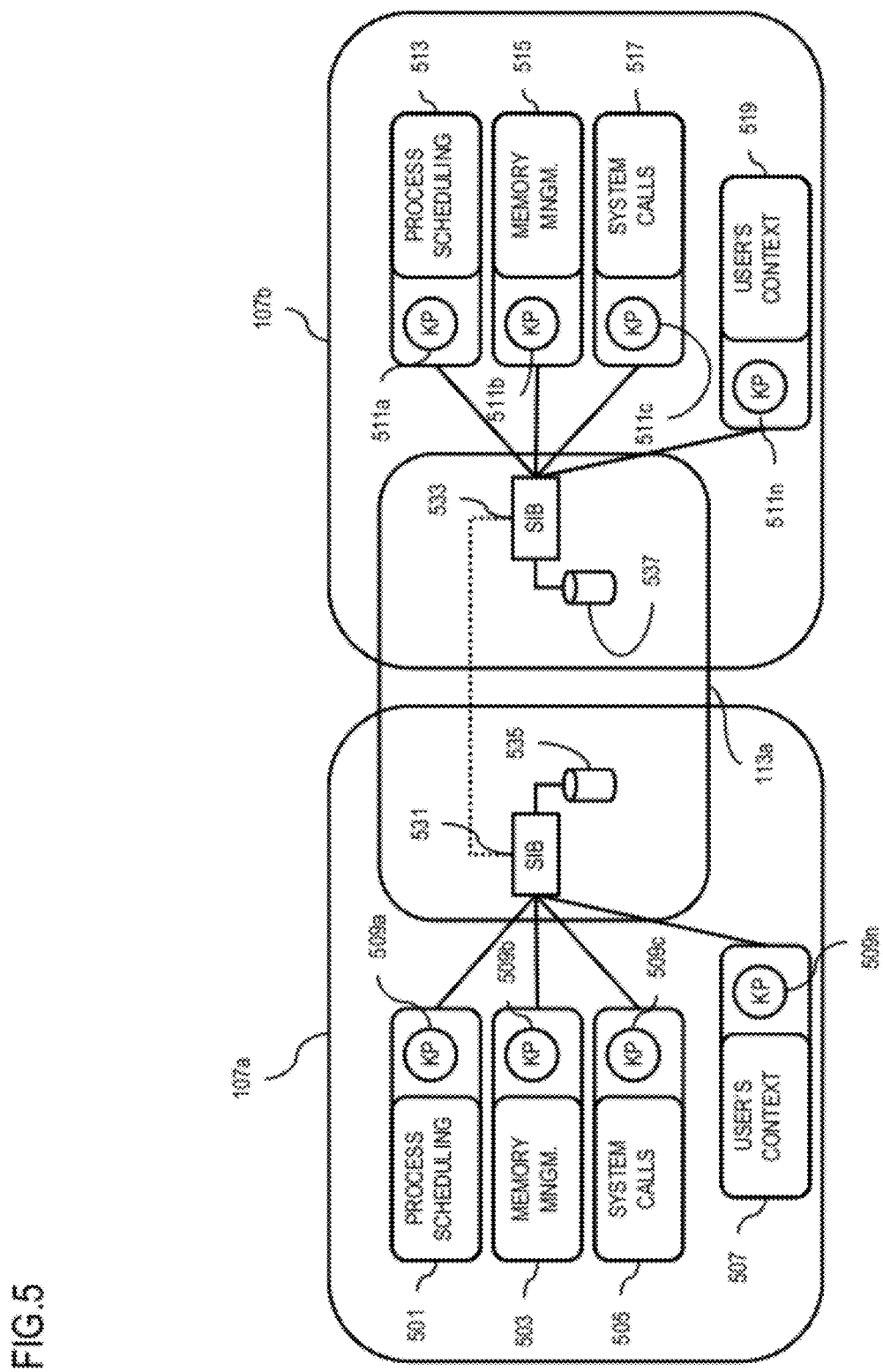
FIG. 5 is a diagram of sharing computation closures, according to one embodiment.

FIG. 5 is a diagram of sharing computation closures, according to one embodiment. The user may own an information space set 113a which is distributed between devices 107a-107i and other remote devices having connectivity to via communication network 105. The information space set 113a includes Semantic Information Brokers (SIB) 531 in UE 107a, and the SIB 533 in UE 107b. Additionally, each information space in set 113a has knowledge processors (KPs) 509a-509n in UE 107a and 511a-511n in UE 107b. Furthermore, the information space may utilize storage components 535 and 537 of the devices involved in the information space. The SIBs of information space set 113a may communicate with each other (shown with dotted line).

The UEs 107a-107i have connectivity to the information spaces 113a-113n via an information management infrastructure (not shown). Typically, during the information processing lifecycle of an information space 115a-115j, one or more execution contexts represented in RDF graph format are locally stored on the stored UEs 107a-107i. The storing of execution contexts may be a result of execution of an application which may also be stored on the UEs 107a-107i. In one embodiment, the application may detect that one or more of back-end devices of the information space environment 113a-113n may be communicating information over a communications medium. The UEs 107a-107i can share the user and system context with the back-end device over the communications medium, for continued or enhanced execution of the application by the back-end device. In another embodiment, the UEs 107a-107i may detect information provided by the information space that may result in closing the communication connection with the (for example, stationary wireless) back-end device. In this embodiment, the UEs 107a-107i may receive an updated user and system context from the back-end device over the communications connection for continued execution of the application by the UEs 107a-107i.

Upon receiving one or more user and system contexts and relevant information over a communications medium from UEs 107a-107i at the back-end device, the back-end device executes or shares the reflective state of the application. The back-end device can determine, through corresponding applications, information shared with the information space 115a-115j wherein the sharing may result in closing a secure communication link with UEs 107a-107i. Subsequently, the back-end device, prior to closing of the communication connection, may share an initial portion of the updated user and system context with UEs 107a-107i over an initial communication connection and share the remaining portion of the updated user and system context with UEs 107a-107i over a last communication connection for continued execution of the application by UEs 107a-107i. The sharing of the user and system context and execution of the application by UEs 107a-107i may be managed by the information management infrastructure as previously described. Such virtual run-time environment enables shared user and system context sessions between UEs 107a-107i and back-end devices.

Typically, during an information processing lifecycle, one or more execution contexts that may be represented in RDF form based on sub-graphs are stored by a SIB 531 of an information space 113a. The user context and execution context may result from execution of a program code of an application by a KP 509a and stored in memory 535 of UE 107a which is utilized by SIB 531. If a KP 509a of UE 107a detects that the UE 107b is attempting to communicate with UE 107a over a communications medium, UE 107a can share the user and execution contexts over a communications connection in the communications medium with UE 107b for continued or enhanced execution of an application by a KP 511a in UE 107b. Following the completion of the process on UE 107b, the UE 107a may receive an alert from the SIB 531 indicating closing of the communication connection with (for example stationary wireless) UE 107b. In this case, UE 107a may receive updated user and execution contexts from the UE 107b over the communications connection so that the UE 107a can continue the execution of the application on a KP 509a.

In one embodiment, the information and execution contexts to be shared between UE 107a and UE 107b may be associated with sharing one or more location based content items among the UEs provided by the information aggregation platform 103. It is noted that a communications medium can be physical or logical/virtual, but in this embodiment is managed by the information aggregation platform 103. The sharing of the user and execution contexts and reflective process execution of the applications associated with location based content aggregation on a KP 511a of UE 107b is managed by the information aggregation platform 103. The information aggregation platform 103 shares and provides reasoning about user and execution contexts between UE 107a and UE 107b with SIBs 531 and 533. For example, UE 107a may be a wireless mobile belonging to a user that requested location based content and UE 107b may be a mobile device that belongs to a friend of the user and includes, in its user's context 519 or in database 537, content items associated with the user's request. In other embodiments, a device UE 107a may be a mobile wireless device while the device 107b is a back-end device (e.g., a stationary wireless device).

The information aggregation platform 103 enables aggregation of user and execution context information and scheduling of the run-time environment. This enables changes to be made to one or more user contexts 507 and 519 and execution contexts (not shown). Changes to user and execution contexts may include starting, executing, scheduling, and dispersing, and aggregating of information related to location based content aggregation within the environment of the information space set 113a processes or tasks wrapped through KPs 509a-509n and 511a-511n or other KP functionalities such as process scheduling 501 and 513, memory management 503 and 515, system calls 505 and 517, etc.

KPs 509a-509n and 511a-511n and their corresponding information in the form of RDF sub-graph dispersion and aggregation may be performed by selective recycling apparatus of the information space set 113*a* and/or the distribution. Selective recycling may be driven by a recovery-conscious scheduler that may be part of the information space environment scheduler and supported by information provided by the computing environment processes/tasks scheduler 501 and 513. The user contexts 507 and 519 and the execution contexts (not shown) related to location based content aggregation may be dynamically assigned and triggered by the information aggregation platform 103 and allocated according to a particular or operating system task management. It is noted that the terms KP and relevant information within SIB, represented as RDF sub-graph sets are abstract enough to be presented through other procedural aspects of the computing environment (e.g., a higher abstraction level).

In one embodiment, following the receipt of one or more user contexts 507 and 519 and additional execution contexts by UE 107*b* from UE 107*a*, and other relevant information over a communications medium, the UE 107*b* executes or shares the reflective state of the application by a KP 511*a*. Upon completion of the process, the UE 107*b* may determine the information shared with SIB 533 through corresponding KPs 511*a*-511*n*. This determination may result in closing a secure communication link with UE 107*a*. Prior to closing the communication connection, the UE 107*b* may share one or more user and execution contexts with UE 107*a* over the communications medium for continued execution of the application by a KP 509*a* in UE 107*a*. The sharing of the user and execution contexts and execution of the application on UE 107*a* is managed by the information aggregation platform 103. Such virtual run-time environment enables shared user and execution context sessions between UE 107*a* and UE 107*b*.

In another embodiment, prior to closing of the communication connection, the UE 107*b* may share an initial portion of the updated user and execution context with UE 107*a* over a initial communication connection and share the remaining portion of the updated user and execution contexts with UE 107*a* over the last communication connection for continued execution of the application on UE 107*a*. The adaptive computing platform described enables granular information processing context migration capability for a computing device to enhance the processing power of the devices within the information space environment.

Figure 6:
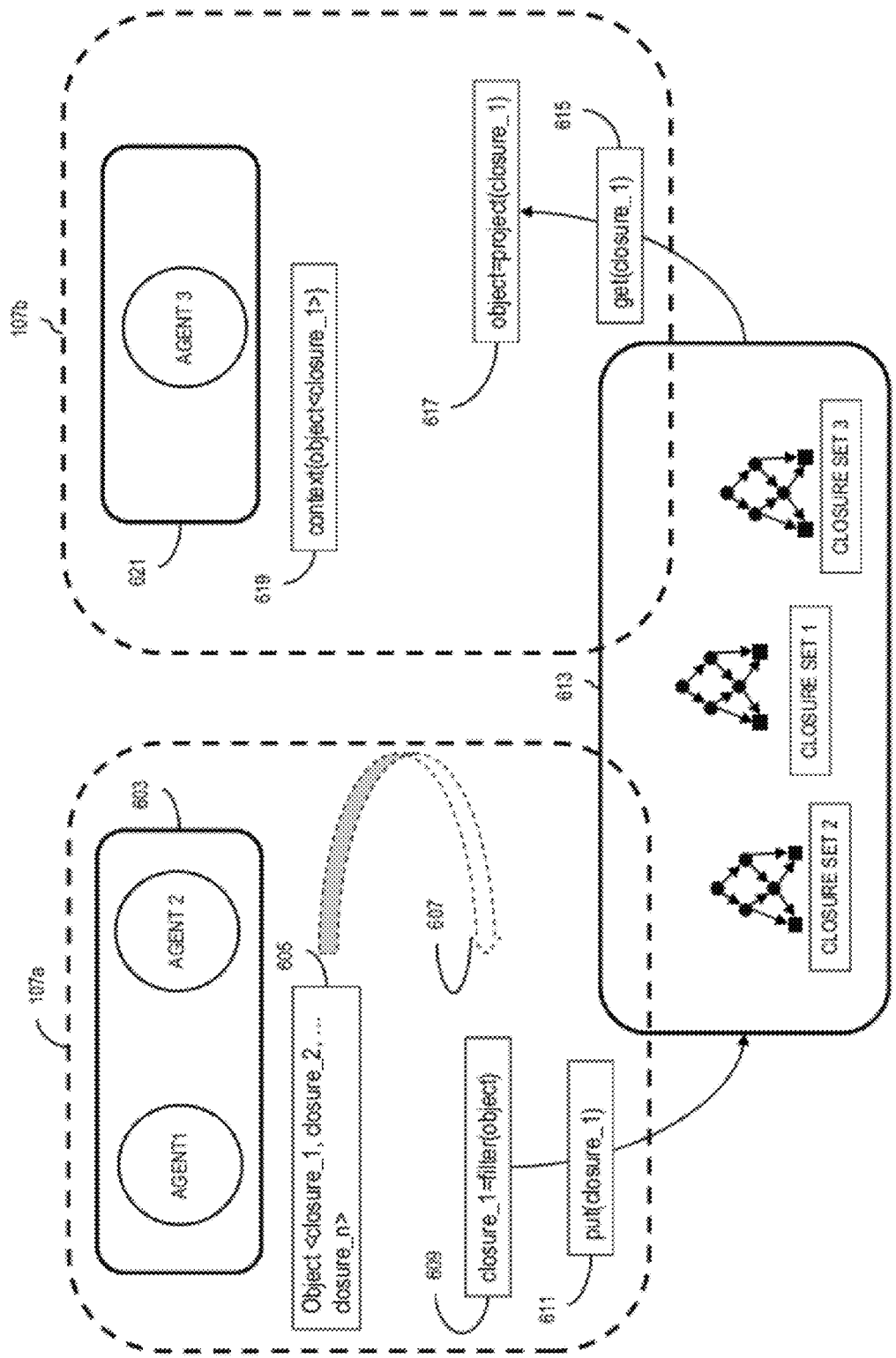
FIG. 6 is a diagram of process migration from a device to another device, according to one embodiment.

FIG. 6 is a diagram of process migration from a device to another device, according to one embodiment. In one embodiment, the UE 107*a* may include a user context 603 for every user of UE 107*a*. In one embodiment, the user context 603 may include computation closures to enable UE 107*a* to be activated and function as a content provider to the network for other UEs having connectivity to. Agent1 and agent2 may be processors that calculate and handle computation closures within the user context 603. The number of agents may be different in different devices based on their design, functionality, processing power, etc.

In one embodiment, the UEs 107*a* and 107*b* may be mobile devices belonging to friends who are members of one or more social networks, in which they have indicated each other as friends. In some other embodiments, one of the UE 107*a* or the UE 107*b* may be a back-end device providing services to the users and the other device may be a UE which is signed up for the services provided by the back-end device. It is assumed in this example that user context 603 provides UE 107*a* with computation closures associated with the content requested by UE 107*b*. Therefore user context 603 and corresponding computation closures are migrated or otherwise provided to UE 107*b* based on a request for content initiated by UE 107*b* to the communication network 105. The migration process may be initiated by the information aggregation platform 103 upon receiving the request from UE 107*b*. The information aggregation platform 103 activates Agent1 and Agent2 which initiate migration of the computation closure 605 to the information space 113*a*. The migration may be initiated by determination of the location where the user of UE 107*b* has requested content associated with, by location determination module 201.

Block 605 represents an Object as a set of computation closures (e.g., closure_1, closure_2, . . . , and closure_n) where each closure is a component of a larger process, for example, related to a service provided to the user by the user equipment 107*a* such as a location based content aggregation. Each closure can be a standalone process that can be executed independently from the other closures. In the example of FIG. 6, the filtering process 607 extracts closure_1 from the closure set Object via filtering the set (shown in block 609). The filtering process may include determining the location associated with the content and by the location determination module 201, and binding the content to the location and grouping the content items by the location information binder 203. The extracted closure_1 is added to a computation closure store 613 using the exemplary Put command 611 by the closure distributor 209. In this example, assuming that the extracted computation closure, closure_1 is supposed to be executed on the user equipment 107*b*, the user equipment 107*b* extracts the computation closure closure_1 from the computation closure store 613 using the Get command 615.

In one embodiment, the extracted closure_1 on UE 107*b* is projected into a closure with the user device context (process states) and presented in a mapping display by the map generator 205 and as a result the object 617 is produced on UE 107*b*. The object 617 may then be processed by the information relevancy evaluator 207, and if the relevancy of its content with the user context is approved, the Object 617 is reconstructed into the user context by the closure binder/distributor 209, as seen in block 619. The aggregated context may then be executed in the run-time environment 621 of UE 107*b* by Agent3, allowing UE 107*b* to receive the aggregated content the user requested (for example on the UI of the UE 107*b*).

In another embodiment, the information related to location based content aggregation which is transferred from UE 107*a* to UE 107*b* via computation closure store 613 is converted into computation closures in RDF format by the information space management system (not shown), if they are not already in RDF format. The migration processor Agent3 of UE 107*b*, which may be part of a larger process 621, and may be written in languages different from processors Agent1 and Agent2 in UE 107*a* (e.g., Python® or JavaScript®), enable the migration of the processes into the UE 107*b*.

Upon receiving the process migration information at the UE 107*b*, activation of the Agent3 may trigger resumption of the execution of migrated computation closures within context 619 which enables UE 107*b* to observe the content aggregated based on location.

Figures 7A, 7B:
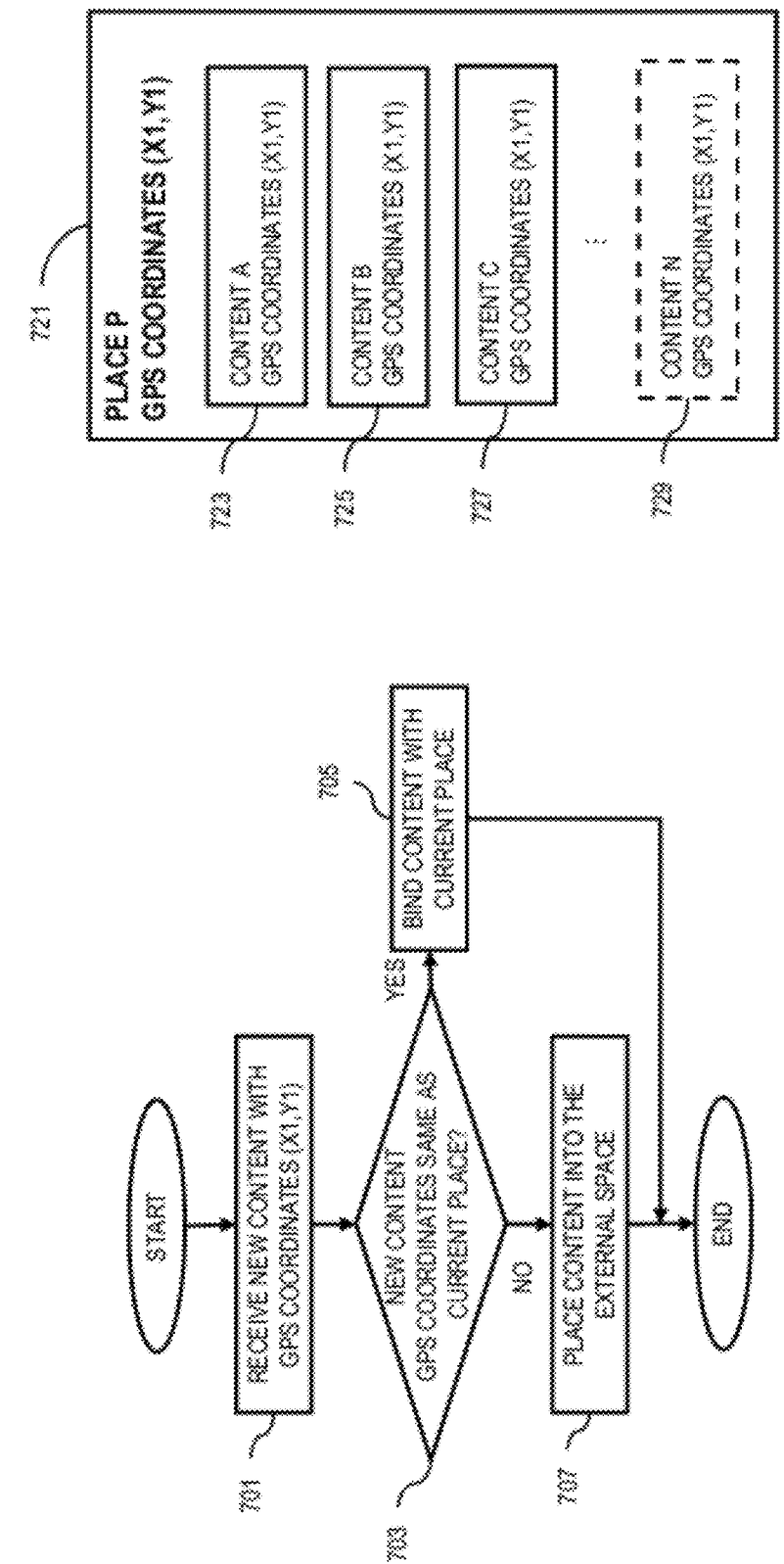
FIGS. 7A-7B are a flowchart and a corresponding diagram of content representation based on place, according to one embodiment.

FIGS. 7A-7B are a flowchart and a corresponding diagram of content representation based on place, according to one embodiment. As previously described, in one embodiment, the information aggregation platform 103 may have the location information binder 203 to group all the available content items according to their location and every new content may be added to its respective group. FIGS. 7A and 7B represent this embodiment. In step 701 the location information binder 203 receives a new content associated with location coordinates (x1, y1). Assuming that the current place of the UEs 107a-107i is considered as the target location, per step 703 the location determination module 201 determines whether the location coordinates of the new content is the same as the current place coordinates. If the locations are the same the new content is bound to the current place by the location information binder 203 per step 705. Otherwise, in step 707 the new content is stored in the information space 113a-113n without being bound to any specific location. As seen in FIG. 7B, block 721 is the group of content items associated with place P with coordinates (x1, y1). Group 721 of content items consists of n content items A (723), B (725), C (727), ..., to N (729), where all the content items share their location coordinates (x1, y1) with Place P.

Figure 8:
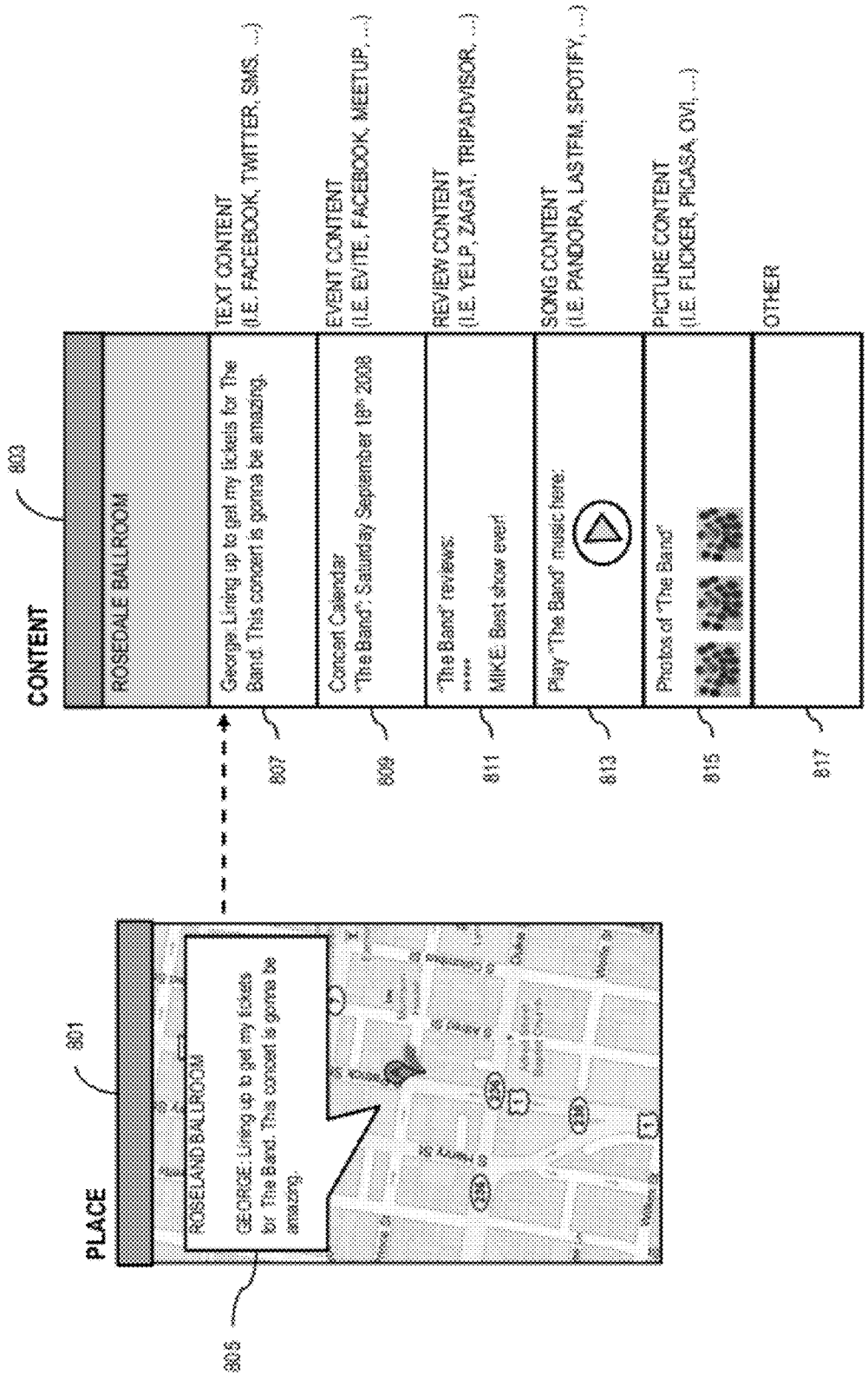
FIG. 8 is a screen shot of a user interface displaying content based on place, according to one embodiment.

FIG. 8 is a screenshot of a user interface displaying content based on place, according to one embodiment. As seen in FIG. 8, screenshot 801 represents a map display of a place of interest 805 associated with an event (e.g., a concert). The user of the UE associated with UI 801 may have requested aggregated content about the event 805. Screenshot 803 represents the requested aggregation of content items from multiple sources. As seen in screenshot 803, the content item 807 which is determined by the location information binder 203 from a social networking source such as Facebook®, Twitter®, SMS®, etc., is a text about the event in target place 805, wherein the provider of content 807 is a friend of the requesting user. The content item 809 is content regarding the event in place 805 from the event website. Content 811 is a review about the event in place 805 from a review website such as Yelp®. Content 813 is another content related to the event in place 805 obtained from the internet. For example, if the event is a concert, the content 813 may include sample music from the concert performers, lyrics, artist biographies, news, etc. Content 815 may include images related to the event and content 817 may represent other categories of content items related to the event. As seen in FIG. 8, the user is able to access various contents associated with the event in place 805 from multiple sources.

The processes described herein for providing information aggregation around locations may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
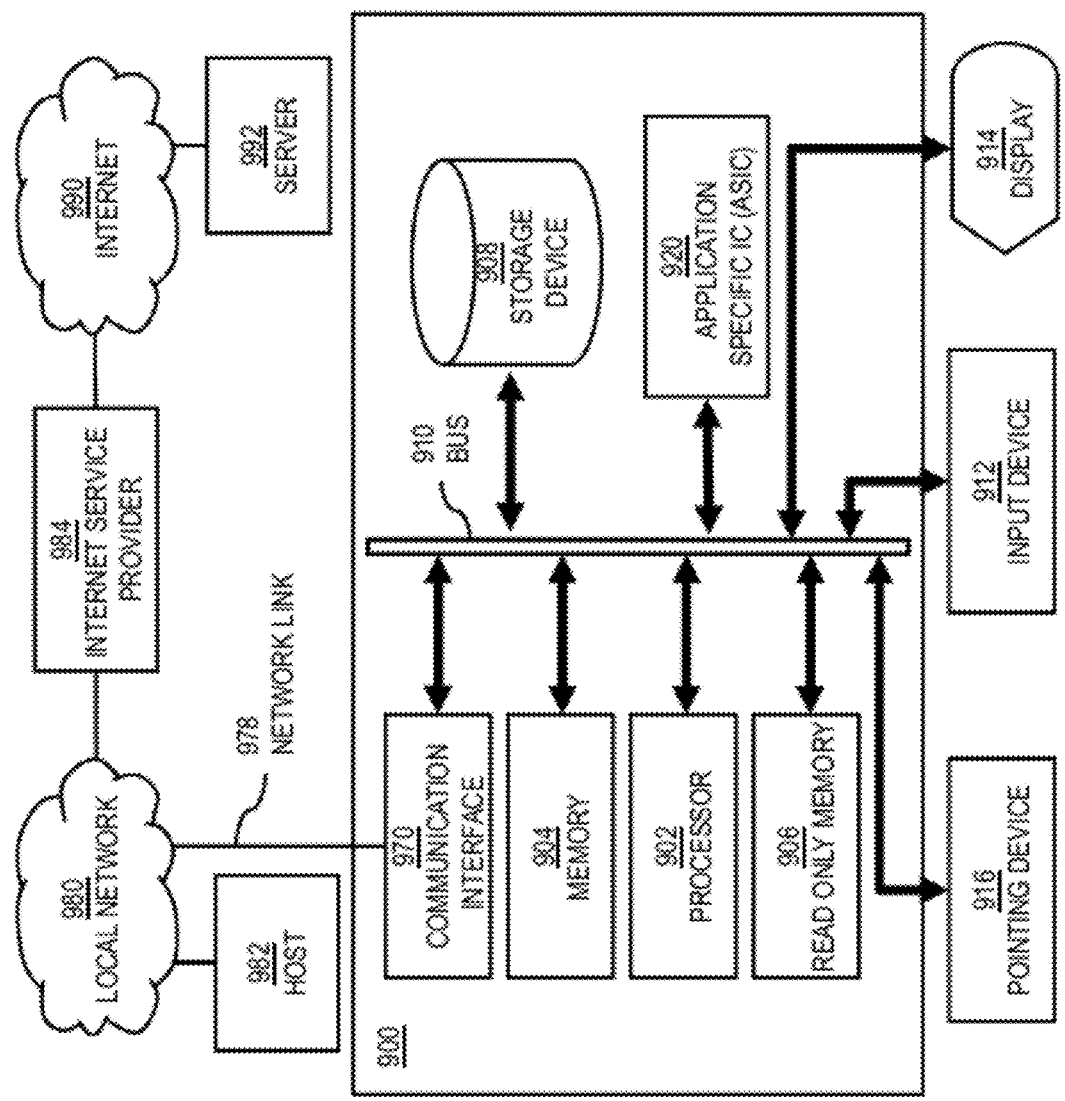
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to provide information aggregation around locations as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of providing information aggregation around locations.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to providing information aggregation around locations. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for providing information aggregation around locations. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing information aggregation around locations, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for providing information aggregation around locations to the UEs 107a-107i.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to provide information aggregation around locations as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of providing information aggregation around locations.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide information aggregation around locations. The memory 1005 also stores the data associated with or generated by the execution of the inventive steps.

Figure 11:
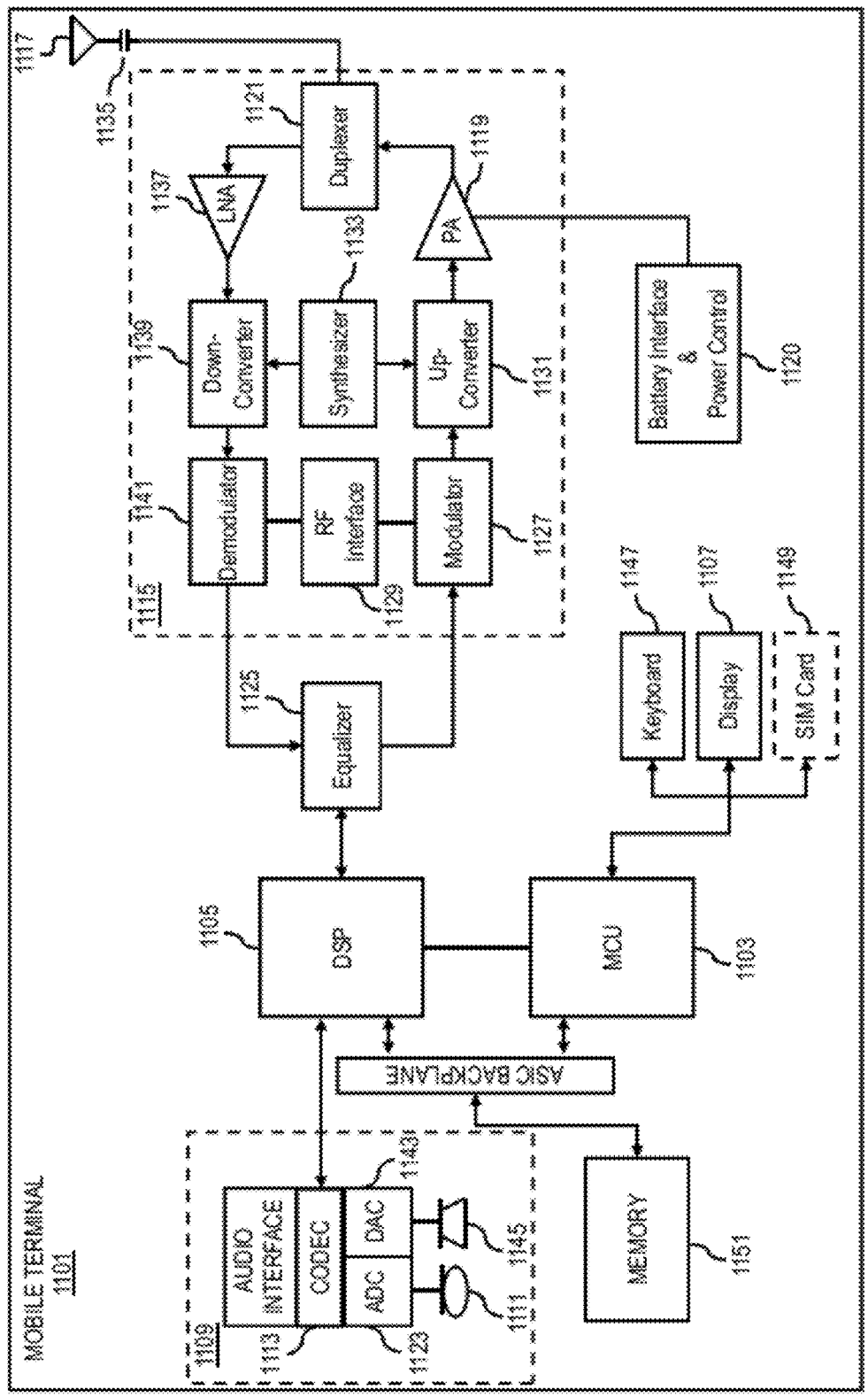
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of providing information aggregation around locations. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of providing information aggregation around locations. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to provide information aggregation around locations. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining, with a processor, one or more content items in response to request for aggregated content associated with one or more locations, the content items provided by respective one or more content sources;
    determining, with the processor, respective location information associated with the one or more content items;
    determining, with the processor, to group the one or more content items based, at least in part, on the respective location information;
    determining to generate a mapping display, on a first user device, displaying the grouped one or more content items;
    determining two or more computation closures, two or more information closures, or a combination thereof associated with the one or more content items, wherein each computation closure and information closure is a component of a process to obtain the requested aggregated content;

determining to bind the two more computation closures, the two more information closures, or a combination thereof to one or more user interface elements of the mapping display based, at least in part, on the grouping, the respective location information, or a combination thereof;

determining to further generate the mapping display based, at least in part, on the binding;

determining to assign one or more of the two or more computation closures, the two or more information closures, or the combination thereof, to the second user device via an action by a user at the first user device; and adding the assigned one or more of the two or more computation closures, the two or more information closures, or the combination thereof to a computation closure store for retrieval by the second user device, wherein the adding of the one or more of the two or more computation closures, the two or more information closures, or the combination thereof to the computation closure store is initiated by an aggregation platform based on the request for the aggregated content by the second user device, and wherein the aggregation platform is remote from and in communication with the first user device and the second user device.

2. A method of claim 1, further comprising:
determining to present one or more links to the one or more content items in the mapping display based, at least in part, on the grouping.

3. A method of claim 2, further comprising:
determining context information associated with the user, the content items, the respective location information, the one or more content sources, or a combination thereof; and
determining information relevancy based, at least in part, on the context information,
wherein the determining to present the one or more content items is based, at least in part, on the information relevancy.

4. A method of claim 3, wherein the context information includes a location, a time, a date, a contact, or a combination thereof.

5. A method of claim 1, wherein the two more computation closures, the two or more information closures, or a combination thereof are serialized within one or more information spaces, one or more computation spaces, or a combination thereof.

6. A method of claim 1, further comprising:
receiving an input for specifying target location information;
determining to compare the target location information against the respective location information; and
determining to select a subset of the one or more content items based, at least in part, on the comparison.

7. A method of claim 6, wherein the target location information is based, at least in part, on a user location.

8. A method of claim 1, further comprising:
determining to associate the one or more content items to one or more places based, at least in part, on the grouping, the respective location information, or a combination thereof.

9. An apparatus comprising:
at least one processor; and
at least one memory including computer program code for one or more programs,
the at least one memory and the computer program code configured to, with the at least one processor, cause the apparatus to perform at least the following,
determine one or more content items in response to request for aggregated content associated with one or more locations, the content items provided by respective one or more content sources;
determine respective location information associated with the one or more content items;
determine to group the one or more content items based, at least in part, on the respective location information;
determine to generate a mapping display, on a first user device, displaying the grouped one or more content items;
determine two or more computation closures, two or more information closures, or a combination thereof associated with the one or more content items, wherein each computation closure and information closure is a component of a process to obtain the requested aggregated content;
determine to bind the two or more computation closures, the two more information closures, or a combination thereof to one or more user interface elements of the mapping display based, at least in part, on the grouping, the respective location information, or a combination thereof;
determine to further generate the mapping display based, at least in part, on the binding;
determine to assign one or more of the two or more computation closures, the two or more information closures, or the combination thereof, to the second user device via an action by a user at the first user device; and
add the assigned one or more of the two or more computation closures, the two or more information closures, or the combination thereof to a computation closure store for retrieval by the second user device,
wherein the add of the one or more of the two or more computation closures, the two or more information closures, or the combination thereof to the computation closure store is initiated by an aggregation platform based on the request for the aggregated content by the second user device, and
wherein the aggregation platform is remote from and in communication with the first user device and the second user device.

10. An apparatus of claim 9, wherein the apparatus is further caused to:
determine to present one or more links to the one or more content items in the mapping display based, at least in part, on the grouping.

11. An apparatus of claim 10, wherein the apparatus is further caused to:
determine context information associated with the user, the content items, the respective location information, the one or more content sources, or a combination thereof; and
determine information relevancy based, at least in part, on the context information,
wherein the determining to present the one or more content items is based, at least in part, on the information relevancy.

12. An apparatus of claim 11, wherein the context information includes a location, a time, a date, a contact, or a combination thereof.

13. An apparatus of claim 10, wherein the two or more computation closures, the two or more information closures, or a combination thereof are serialized within one or more information spaces, one or more computation spaces, or a combination thereof.

14. An apparatus of claim 9, wherein the apparatus is further caused to:
receive an input for specifying target location information;
determine to compare the target location information against the respective location information; and
determine to select a subset of the one or more content items based, at least in part, on the comparison.

15. An apparatus of claim 14, wherein the target location information is based, at least in part, on a user location.

16. An apparatus of claim 9, wherein the apparatus is further caused to:
determine to associate the one or more content items to one or more places based, at least in part, on the grouping, the respective location information, or a combination thereof.

17. A non-transitory computer-readable storage medium carrying one or more sequences of one or more instructions which, when executed by one or more processors, cause an apparatus to at least perform the following steps:
determining one or more content items, the content items provided by respective one or more content sources;
determining respective location information associated with the one or more content items in response to request for aggregated content associated with one or more locations;
determining to group the one or more content items based, at least in part, on the respective location information;
determining to generate a mapping display, on a first user device, displaying the grouped one or more content items;
determining one or more computation closures, one or more information closures, or a combination thereof associated with the one or more content items;
determining two or more computation closures, two or more information closures, or a combination thereof associated with the one or more content items, wherein each computation closure and information closure is a component of a process to obtain the requested aggregated content;
determining to bind the one or more computation closures, the one or more information closures, or a combination thereof to one or more user interface elements of the mapping display based, at least in part, on the grouping, the respective location information, or a combination thereof;
determining to further generate the mapping display based, at least in part, on the binding determining to assign one or more of the two or more computation closures, the two or more information closures, or the combination thereof, to the second user device via an action by a user at the first user, and
adding the assigned one or more of the two or more computation closures, the two or more information closures, or the combination thereof to a computation closure store for retrieval by the second user device,
wherein the adding of the one or more of the two or more computation closures, the two or more information closures, or the combination thereof to the computation closure store is initiated by an aggregation platform based on the request for the aggregated content by the second user device, and
wherein the aggregation platform is remote from and in communication with the first user device and the second user device.

18. A non-transitory computer-readable storage medium of claim 17, wherein the apparatus is caused to further perform:
determining to present one or more links to the one or more content items in the mapping display based, at least in part, on the grouping.

* * * * *